(12) United States Patent
Kim et al.

(10) Patent No.: US 10,605,354 B2
(45) Date of Patent: Mar. 31, 2020

(54) BUTTON-TYPE TRANSMISSION CONTROL DEVICE

(71) Applicant: KYUNG CHANG INDUSTRIAL CO., Ltd., Daegu (KR)

(72) Inventors: Dong Won Kim, Daegu (KR); Hyeong Seok Hong, Daegu (KR); Min Sik Choo, Busan (KR)

(73) Assignee: KYUNG CHANG INDUSTRIAL CO., Ltd., Daegu (KR)

( * ) Notice: Subject to any disclaimer, the term of this patent is extended or adjusted under 35 U.S.C. 154(b) by 107 days.

(21) Appl. No.: 16/018,828

(22) Filed: Jun. 26, 2018

(65) Prior Publication Data

US 2018/0372213 A1   Dec. 27, 2018

(30) Foreign Application Priority Data

Jun. 26, 2017   (KR) ........................ 10-2017-0080343

(51) Int. Cl.
*F16H 59/12*   (2006.01)
*F16H 59/02*   (2006.01)

(52) U.S. Cl.
CPC ............. *F16H 59/12* (2013.01); *F16H 59/02* (2013.01); *F16H 59/0278* (2013.01); *F16H 2059/026* (2013.01)

(58) Field of Classification Search
CPC ...... F16H 59/12; F16H 59/02; F16H 59/0278; F16H 2059/026
See application file for complete search history.

(56) References Cited

U.S. PATENT DOCUMENTS 3,766,793 A * 10/1973 Knop ..................... B60K 37/06
                                                        74/335
5,161,422 A * 11/1992 Suman ................... B60K 20/04
                                                        74/335
(Continued)

FOREIGN PATENT DOCUMENTS

CN       104505295 A      4/2015
JP       2011-023325 A    2/2011
(Continued)

OTHER PUBLICATIONS

Chinese National Intellectual Property Administration, Office Action, Chinese Application No. 201810670037.3, dated Jul. 11, 2019, 5 pages (with concise explanation of relevance).

*Primary Examiner* — David M Fenstermacher
(74) *Attorney, Agent, or Firm* — Fenwick & West LLP

(57) ABSTRACT

A button-type transmission control device includes: a button portion which includes a first area and a second area different from the first area; a hinge disposed under the button portion; and a substrate which is disposed under the hinge. The substrate includes a first terminal placed under the first area and a second terminal placed under the second area. When pressure is applied to the first area, the button portion is inclined such that the first area descends with respect to the hinge, so that the first area contacts the first terminal, and a gear shift position corresponding to the first terminal is selected. When pressure is applied to the second area, the button portion is inclined such that the second area descends with respect to the hinge, so that the second area contacts the second terminal, and a gear shift position corresponding to the second terminal is selected.

28 Claims, 14 Drawing Sheets

(56) References Cited

U.S. PATENT DOCUMENTS

| | | | | |
|---|---|---|---|---|
| 5,561,416 A * | 10/1996 | Marshall | ................ | B60K 37/06 |
| | | | | 340/456 |
| 6,167,774 B1 * | 1/2001 | Gagnon | ................ | B62K 11/14 |
| | | | | 74/335 |
| 6,227,068 B1 * | 5/2001 | Masui | .................... | B62K 23/02 |
| | | | | 200/61.85 |
| 6,257,081 B1 * | 7/2001 | Gagnon | ................ | B60W 10/02 |
| | | | | 477/63 |
| 6,376,929 B1 * | 4/2002 | Nakajima | ............ | F16H 59/105 |
| | | | | 307/10.1 |
| 6,596,950 B2 * | 7/2003 | Danek | .................. | H01H 19/563 |
| | | | | 200/11 R |
| 6,674,183 B1 * | 1/2004 | Noda | ..................... | H01H 19/58 |
| | | | | 200/571 |
| 8,960,361 B2 * | 2/2015 | Helot | ..................... | B60K 20/02 |
| | | | | 180/326 |
| 9,970,531 B2 * | 5/2018 | Nakano | .................. | B60K 20/02 |
| 10,288,172 B2 * | 5/2019 | Kim | ........................ | F16H 59/08 |
| 10,336,186 B2 * | 7/2019 | Woodhouse | ............ | F16H 59/12 |
| 10,451,177 B2 * | 10/2019 | Helot | ...................... | B60K 20/02 |
| 2007/0137358 A1 * | 6/2007 | Vigil | ....................... | B60K 37/06 |
| | | | | 74/473.3 |
| 2013/0220055 A1 * | 8/2013 | Curl | ........................ | F16H 59/08 |
| | | | | 74/473.33 |
| 2015/0308566 A1 * | 10/2015 | Bialas | .................... | F16H 59/12 |
| | | | | 74/473.12 |

FOREIGN PATENT DOCUMENTS

| | | |
|---|---|---|
| KR | 20-1997-0002533 Y1 | 3/1997 |
| KR | 20-2011-0005022 U | 5/2011 |
| KR | 10-2017-0000718 | 1/2017 |

\* cited by examiner

[Fig. 1]
100
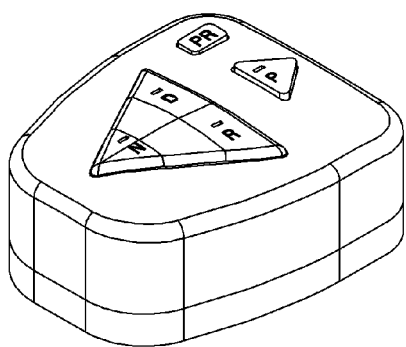 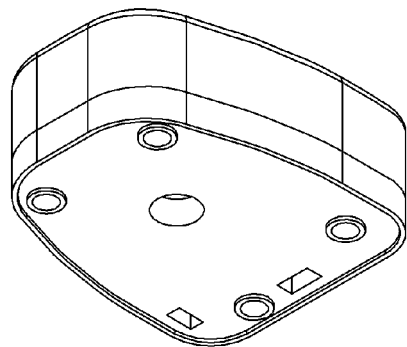
(a)　　　　　　　　　　　　　　(b)

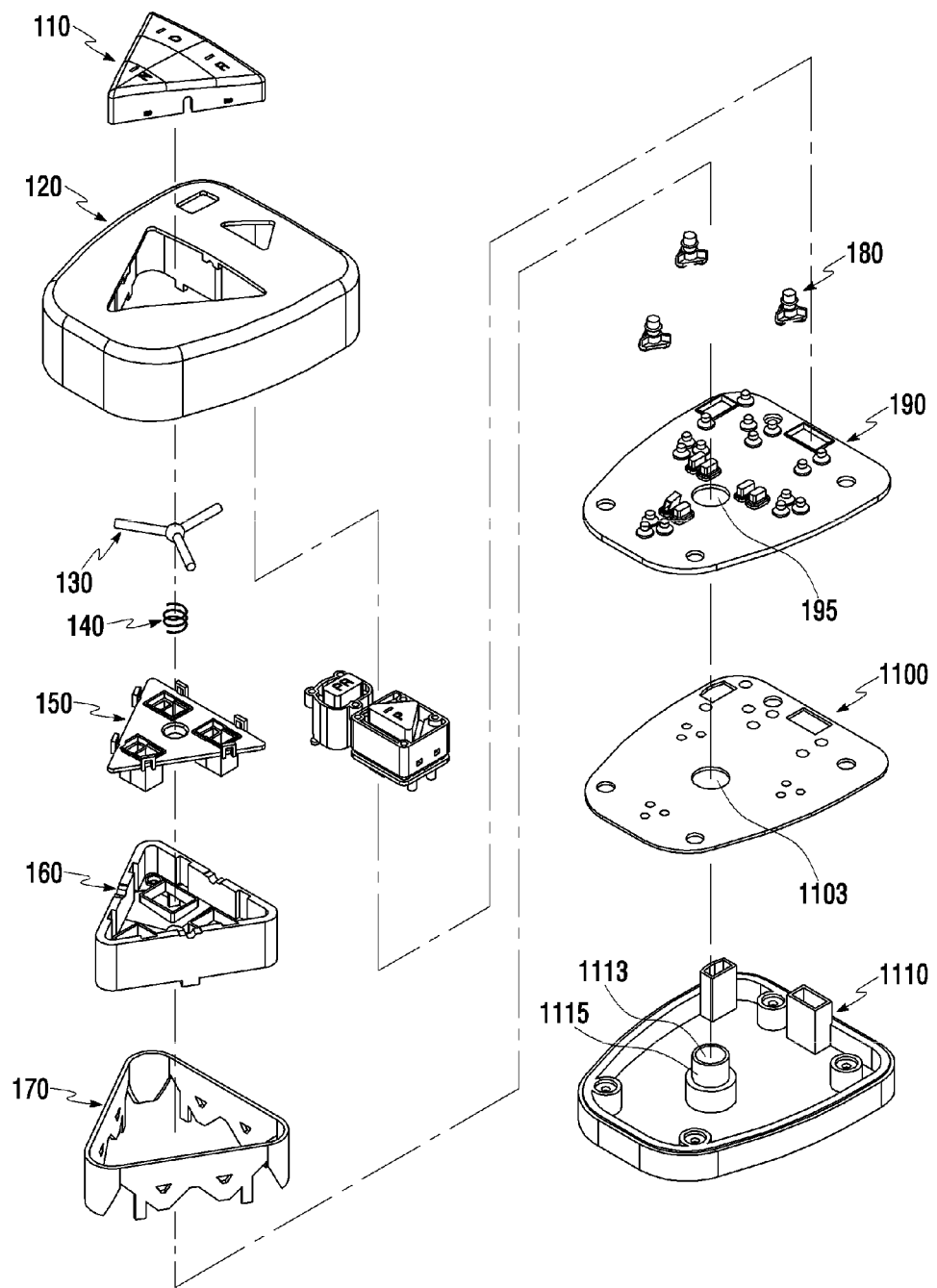
[Fig. 2A]

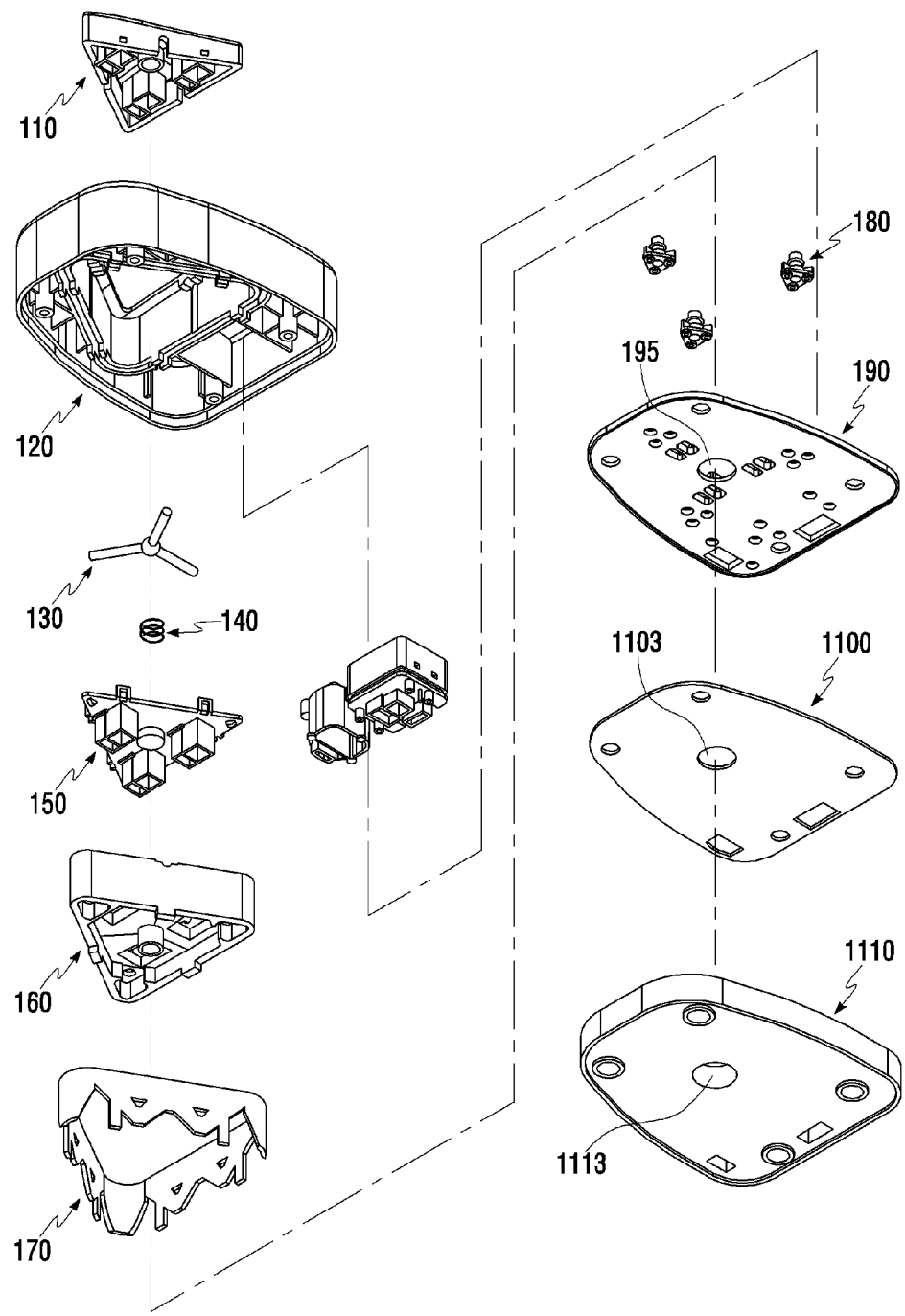
[Fig. 2B]

【Fig. 3】
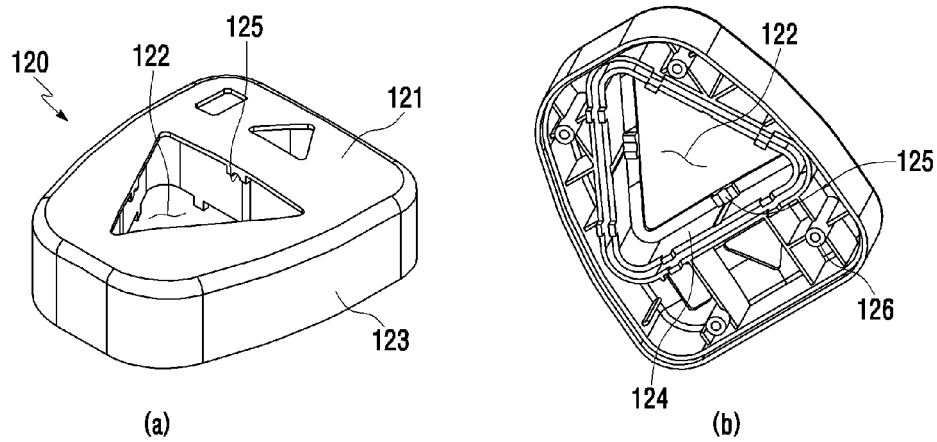
(a)   (b)
【Fig. 4】
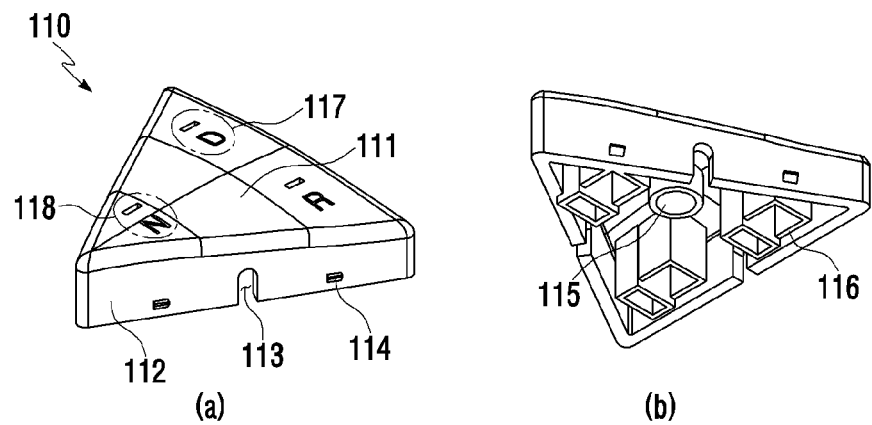
(a)   (b)

[Fig. 5]
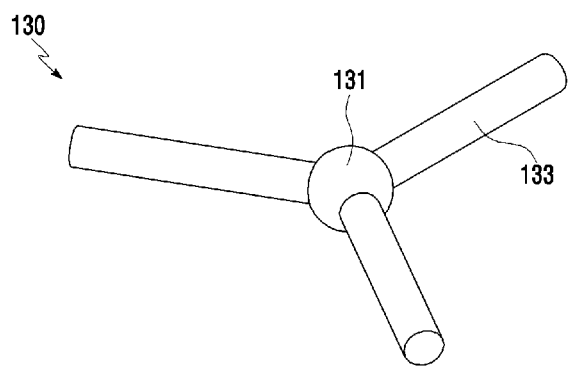
[Fig. 6]
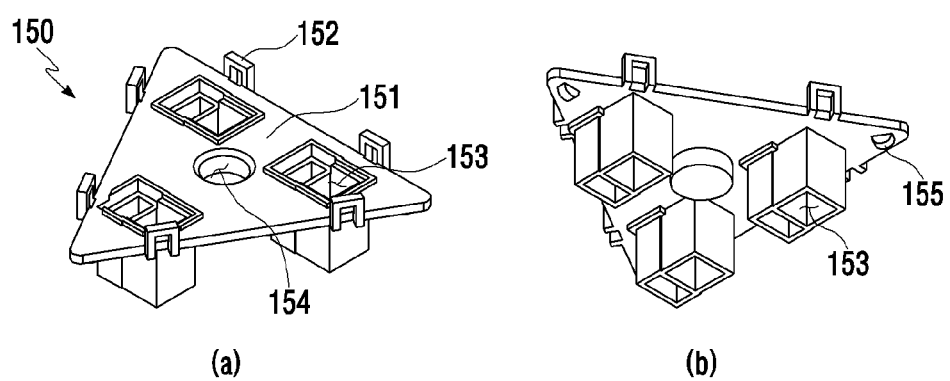
(a)　　　　　　　　　　(b)

[Fig. 7]
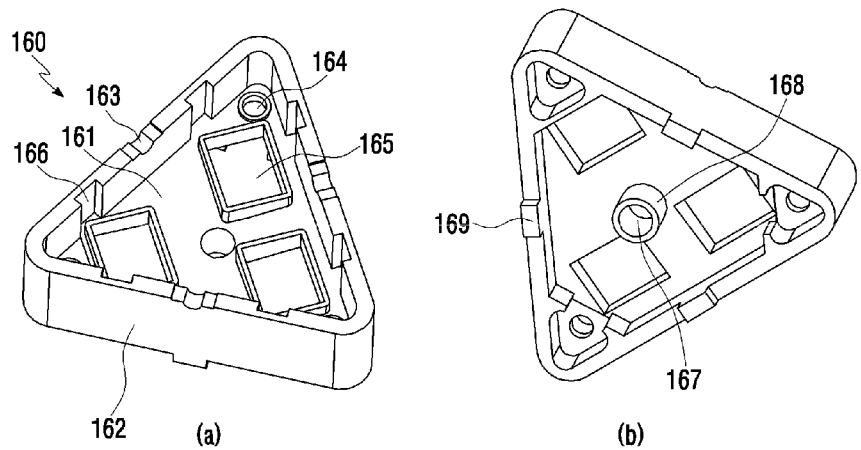
[Fig. 8]
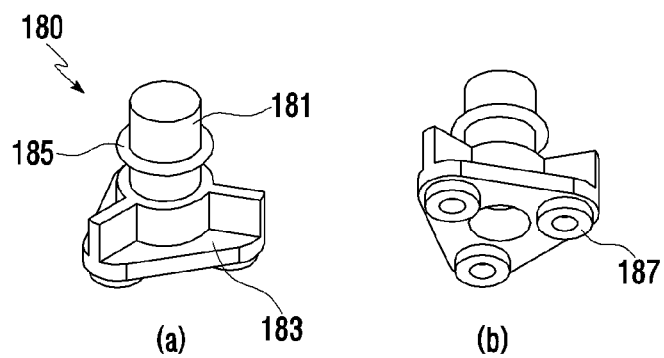
[Fig. 9]
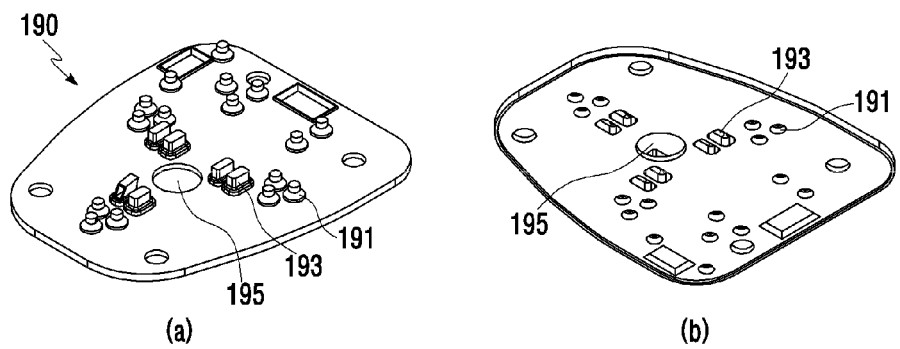

[Fig. 10]
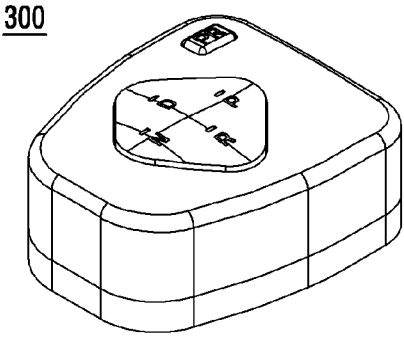
(a)
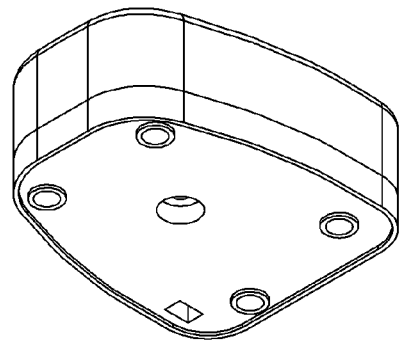
(b)

【Fig. 11A】
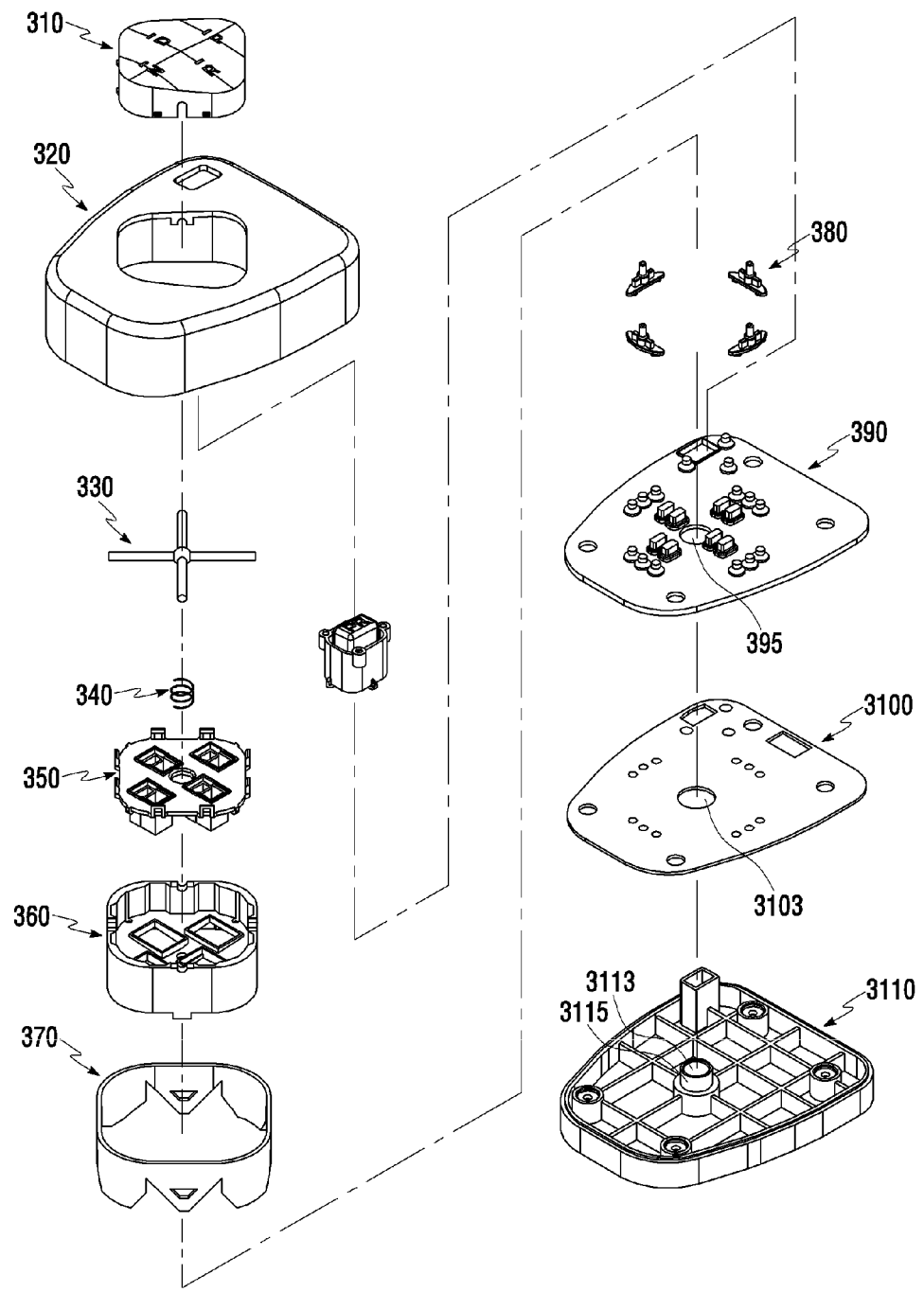

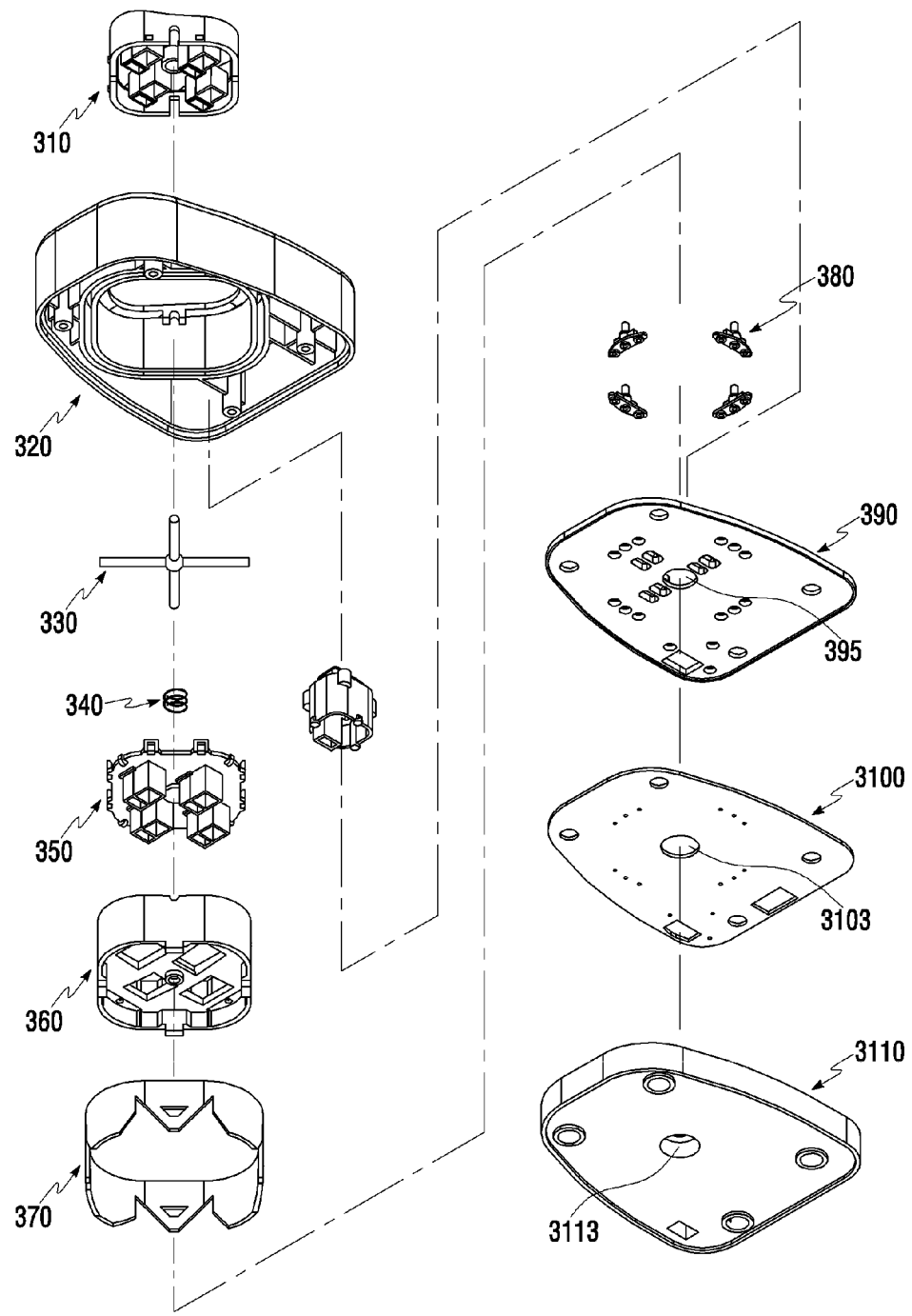
[Fig. 11B]

[Fig. 12]
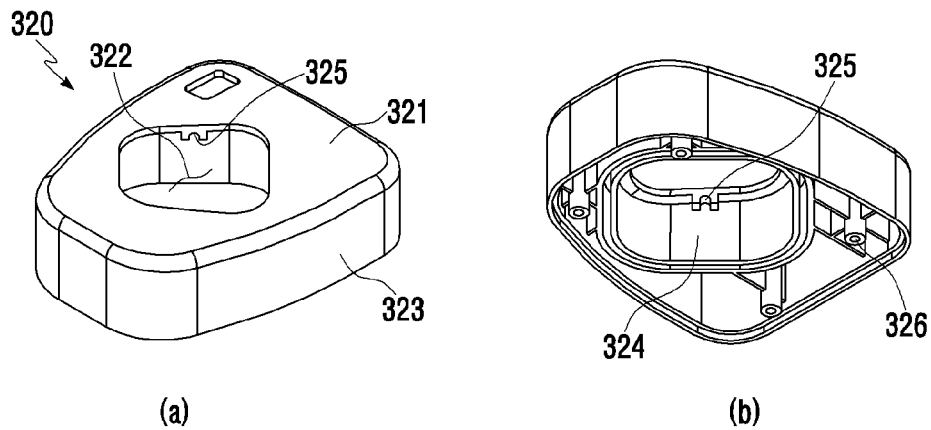
(a)  (b)
[Fig. 13]
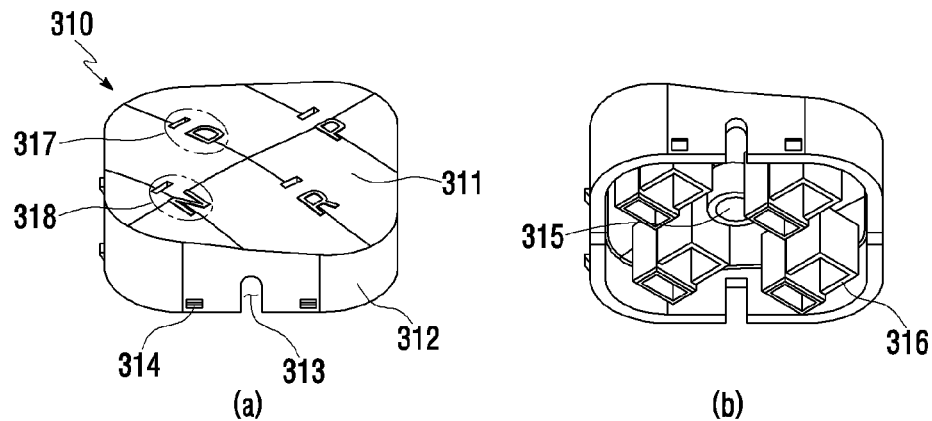
(a)  (b)
[Fig. 14]
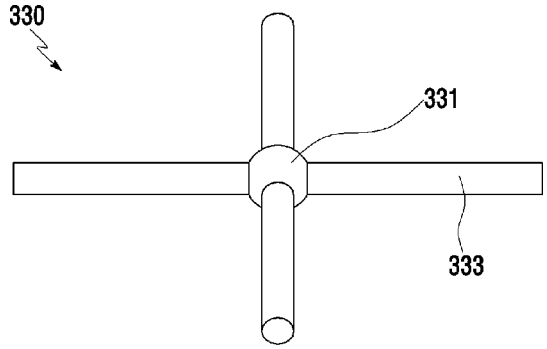

[Fig. 15]
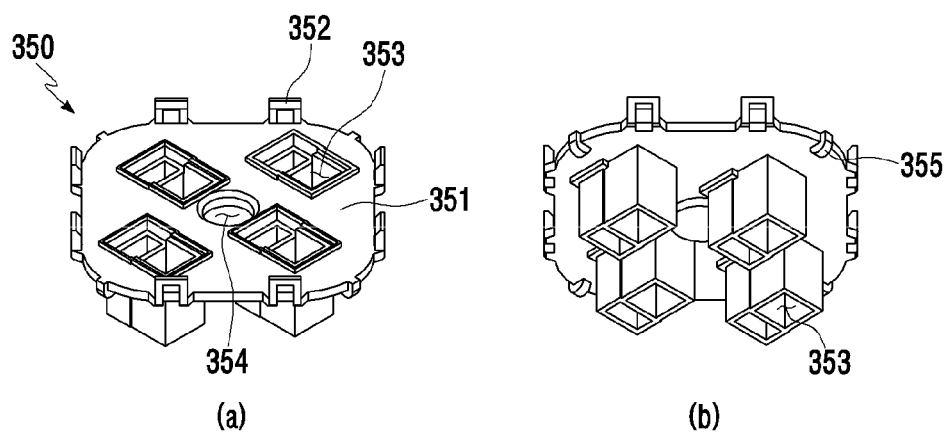
(a)　　　　　　　　　(b)
[Fig. 16]
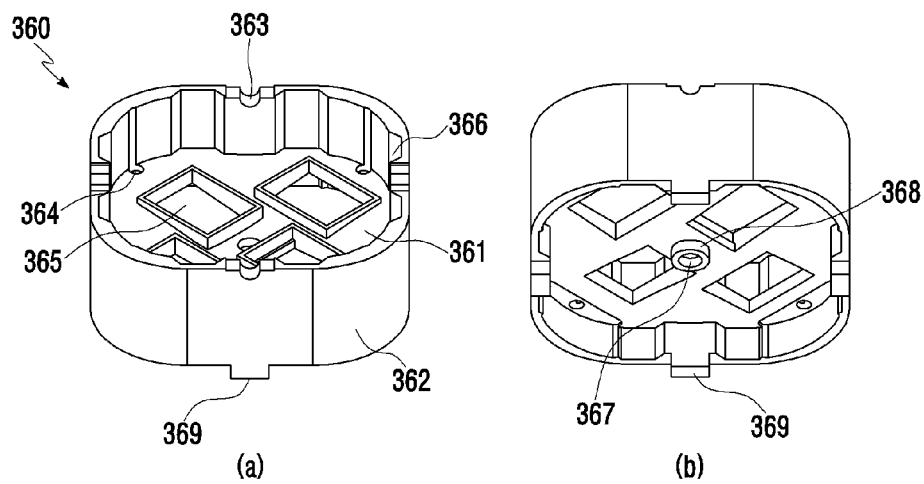
(a)　　　　　　　　　(b)

[Fig. 17]
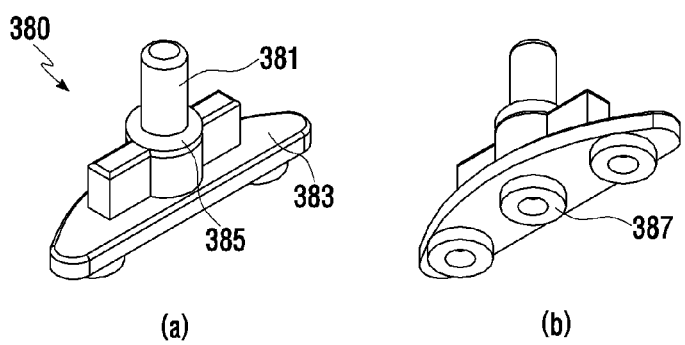
(a)         (b)
[Fig. 18]
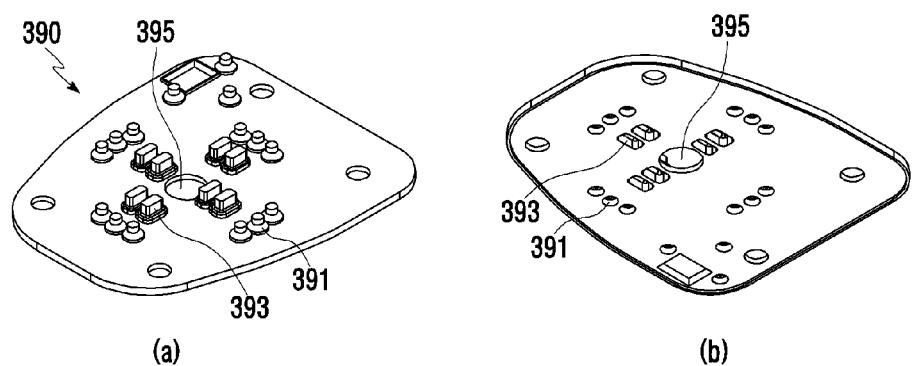
(a)         (b)

【Fig. 19A】
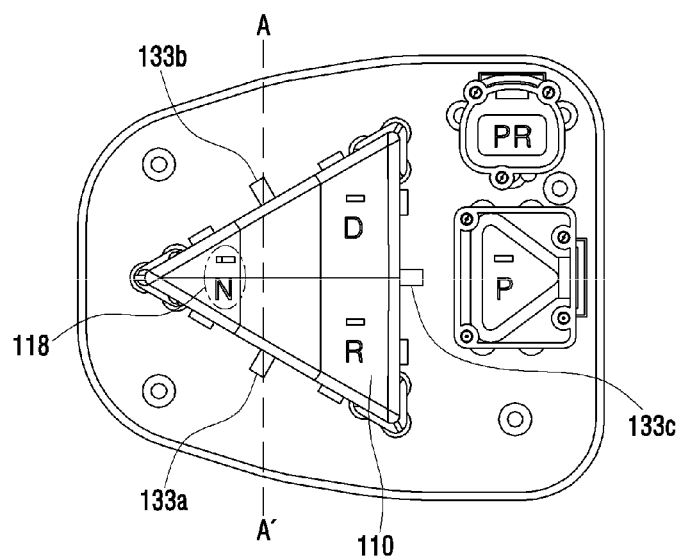
【Fig. 19B】
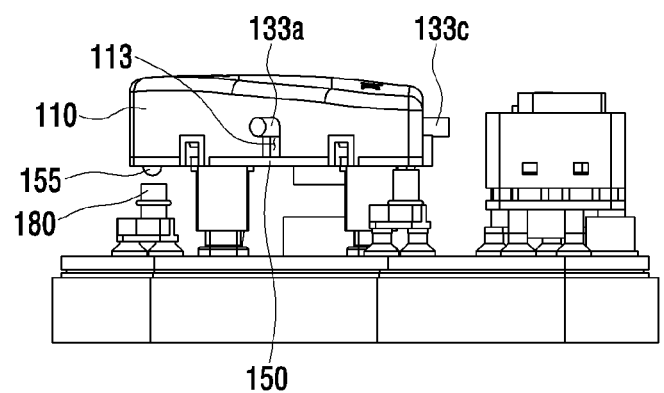

[Fig. 19C]
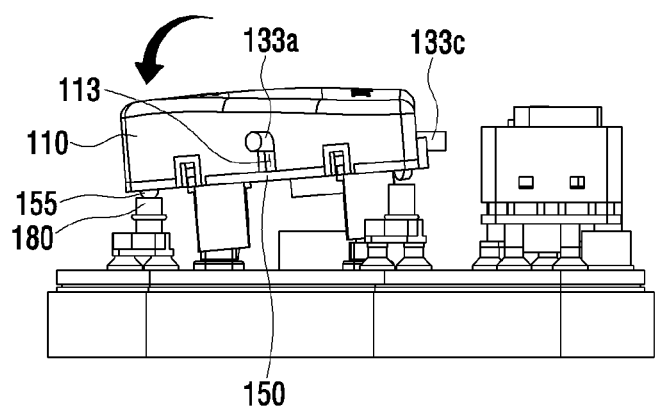

BUTTON-TYPE TRANSMISSION CONTROL DEVICE

CROSS-REFERENCE TO RELATED APPLICATIONS

This application claims the benefit of Korean Patent Application No. 10-2017-0080343, filed on Jun. 26, 2017, which is hereby incorporated by reference as if fully set forth herein.

BACKGROUND

Field

The present disclosure relates to a button-type transmission control device and more particularly to a button-type transmission control device of which the number of parts can be reduced by applying a rotation method.

Description of the Related Art

In general, in a vehicle equipped with an automatic transmission, hydraulic pressure is controlled according to the traveling speed of the vehicle within the set shift range, so that the gearshift in a target shift range is intended to operate automatically.

In order to perform the shifting, the automatic transmission creates a gear ratio by using a hydraulic circuit, a planetary gear, and friction elements. These components are controlled by a transmission control unit (TCU).

Unlike an existing mechanical transmission system, a shift-by-wire (hereinafter, referred to as SBW) system that is an electronic transmission system for a vehicle has no mechanical connection structure such as a cable, between the transmission and the shift lever. When a sensor value generated by operating an electronic shift lever or a button is transmitted to the TCU, a solenoid or an electric motor is operated by an electronic signal commanded by the TCU, and a hydraulic pressure is applied to or shut off from the hydraulic circuit for each shift position by the operation of the solenoid or the electric motor, so that the transmission control is performed electronically.

Therefore, the automatic transmission based on the SBW has an advantage that driver's shift intention is transmitted in the form of an electric signal to the transmission control device by the simple operation of the electronic shift lever or the button, so that it is easier to shift the gear to drive (D) and reverse (R), neutral (N), and parking (P) ranges. Also, the shift lever can become smaller, and thus, a wide space can be secured between the driver seat and the passenger seat.

Meanwhile, a lever-type electronic transmission system in which the shift operation is performed by means of a lever has a shift lever operation method similar to that of a mechanical shift lever, and thus, has no significant advantage compared to the mechanical shift lever. Moreover, due to a large space in the console, a space for peripheral parts such as a cup holder becomes relatively smaller. Particularly, in the event of an accident, an injury may be caused by the contact of the protruding lever and passenger's body.

Also, a button-type electronic transmission system in which the shift operation is performed by a button has the shift operation easier than that of the lever-type electronic transmission system. Also, the installation position can be changed into a position other than the console, so that the console space can be utilized effectively. In the event of an accident, a passenger's body does not come into contact with the button-type electronic transmission system, thereby preventing injuries to the passenger. However, respective buttons operated by the driver for each of the P, R, N, and D shift positions have the same operation method, so that erroneous operation may occur in a situation where the driver operates the shift button without directly looking at the shift button.

For the purpose of overcoming these disadvantages, there exists a button-type electronic transmission system in which the operation method is different for each shift button, so that the driver feels different during the operation of the button, and through this, erroneous operations can be prevented.

However, the use of a plurality of buttons increases the manufacturing cost and decreases the space utilization. Therefore, it is necessary to reduce the number of the buttons as much as possible in order to reduce the weight or the number of parts and to increase the spatial usability.

SUMMARY

Technical Problem

An object of the present disclosure is to provide a button-type transmission control device which minimizes the number of parts constituting the button-type transmission control device, thereby reducing the manufacturing cost thereof and increasing the utilization of the space occupied thereby.

Another object of the present disclosure is to provide the button-type transmission control device which applies a seesaw type push button by creating at least one rotating shaft, thereby mechanically preventing a shift position different from driver's intention from being pushed.

However, the object of the present disclosure is not limited to the above description and can be variously extended without departing from the scope and spirit of the present invention.

Technical Solution

One embodiment is a button-type transmission control device including: a button portion which includes a first area and a second area different from the first area; a hinge which is disposed under the button portion; and a substrate which is disposed under the hinge. The substrate includes a first terminal placed under the first area and a second terminal placed under the second area. When a pressure is applied to the first area, the button portion is inclined such that the first area descends with respect to the hinge, so that the first area contacts the first terminal, and a gear shift position corresponding to the first terminal is selected. When a pressure is applied to the second area, the button portion is inclined such that the second area descends with respect to the hinge, so that the second area contacts the second terminal, and a gear shift position corresponding to the second terminal is selected.

The hinge includes a hinge body and a plurality of hinge bars. The button portion includes a hinge groove located between the first area and the second area. At least one of the plurality of hinge bars is inserted into the hinge groove. The hinge bar is supported from the bottom and is not moved downward even if a pressure is applied to an upper portion of the hinge groove.

The button portion includes a button base including the first area and the second area. The button base includes button side walls extending downward from respective side ends of the button base. The hinge groove is formed in the button side wall and has an open bottom thereof. The plurality of hinge bars are formed on the hinge body and protrude from a center of the hinge body in a direction perpendicular to the button side wall. The plurality of hinge bars are formed on the hinge body at regular intervals.

A button base groove having an open bottom thereof is formed in the middle portion of a bottom surface of the button base. The hinge body is spherical or polyhedral and is disposed in the button base groove.

The button-type transmission control device further includes: an elastic member which is disposed under the hinge; and a button cover which is disposed under the elastic member and is coupled to the button portion. The button cover includes a button cover base having a shape corresponding to the button base. An elastic member fixing portion is formed in the middle portion of a top surface of the button cover base. The elastic member is disposed in the elastic member fixing portion.

The button-type transmission control device further includes a button assembly cover which is disposed under the button portion. The button assembly cover includes an assembly base corresponding to a shape of the button base. The assembly base includes an assembly side wall extending upward from each side end of the assembly base. An assembly hinge bar fixing groove having an open top is formed on a top surface of the assembly side wall. The hinge bar is disposed in the assembly hinge bar fixing groove and is supported.

The button-type transmission control device further includes a button assembly cover which is disposed under the button cover. The button assembly cover includes an assembly base corresponding to a shape of the button cover base. The assembly base includes an assembly side wall extending upward from each side end of the assembly base. The assembly side wall surrounds the button cover.

The button-type transmission control device further includes a click plate which is disposed under the button assembly cover. In the assembly base, a click plate through-hole is formed under the first area and the second area. The click plate has a circular cylindrical shape or a polygonal cylindrical shape. The click plate passes through the click plate through-hole. The click plate transmits the pressure applied to the first area or the second area of the button portion to the first terminal or the second terminal.

The button-type transmission control device further includes a keypad which is disposed under the click plate. The keypad includes one or more keypad contact portions. The one or more keypad contact portions are formed at a position corresponding to the click plate. The substrate is disposed under the keypad. The first terminal and the second terminal are formed at a position corresponding to the click plate. The keypad contact portion transmits the pressure transmitted to the click plate to the first terminal or the second terminal.

The click plate includes a ring damper.

The keypad contact portion includes one or more hemispherical or polygonal column shapes protruding upward.

The keypad contact portion is made of rubber.

The button-type transmission control device further includes a click plate which is disposed under the button assembly cover. In the assembly base, a click plate through-hole is formed under the first area and the second area. The click plate includes a click plate column and a click plate board. The click plate board is a circular board or a polygonal board. The click plate column is a circular column or a polygonal column and is formed to protrude upward from one side of the click plate board. The click plate column passes through the click plate through-hole. The click plate transmits the pressure applied to the first area or the second area of the button portion to the first terminal or the second terminal.

A button barrier wall protruding downward is formed at positions of a bottom surface of the button base, which correspond to the first area and the second area. The substrate further includes one or more light emitting devices. The light emitting device is formed at a position corresponding to the button barrier wall.

A button cover barrier wall hole protruding downward is formed at positions of the button cover base, which correspond to the first area and the second area. The substrate further includes one or more light emitting devices. The light emitting device is formed at a position corresponding to the button cover barrier wall hole.

The button-type transmission control device further includes a button assembly cover which is disposed under the button portion. The button assembly cover includes an assembly base corresponding to a shape of the button cover base. In the assembly base, a click plate through-hole is formed under the first area and the second area. In the assembly base, a barrier wall through-hole is formed adjacent to the click plate through-hole. The button cover barrier wall hole is inserted into the barrier wall through-hole.

The button-type transmission control device further includes a keypad which is disposed on the substrate. The keypad further includes one or more keypad barrier wall holes. The keypad barrier wall hole is disposed under the barrier wall through-hole.

The substrate further includes one or more light emitting devices. The light emitting devices are formed at positions corresponding to the first area and the second area.

The button-type transmission control device further includes a housing. The housing includes a housing base. The housing base includes a main hole corresponding to a shape of the button base. A housing hinge bar fixing groove having an open bottom thereof is formed in a bottom surface of the housing base adjacent to the main hole. The hinge bar is disposed in the housing hinge bar fixing groove.

The button-type transmission control device further includes an elastic member which is disposed under the hinge; and a button cover which is disposed under the elastic member and is coupled to the button portion. The button cover includes a button cover base having a shape corresponding to the button base. Each of the button side walls of the button portion includes one or more button side wall catching portions. The button cover base includes one or more button cover catching portions formed at each side end of the button cover base. The button side wall catching portion and the button cover catching portion are fastened to each other.

When the pressure is applied to the first area, the first area is rotated downward about a line connecting supporting points at which two hinge bars adjacent to the first area are supported from the bottom, and remaining areas other than the first area are rotated upward.

The button assembly cover further includes an assembly base drain hole and a hole side wall. The hole side wall is formed to protrude downward around the assembly base drain hole.

The assembly base is formed as an inclined surface having the assembly base drain hole as the lowest point.

The button-type transmission control device further includes a housing support which is coupled to the housing. The housing support includes a support drain hole and a support drain hole side wall. The support drain hole side wall is formed to protrude upward around the support drain hole. The hole side wall and the support drain hole side wall are arranged to be overlapped with each other.

Advantageous Effects

The button-type transmission control device according to the embodiments of the present disclosure which minimizes the number of parts constituting the button-type transmission control device, thereby reducing the size thereof and increasing the utilization of the space.

Also, since the number of parts is reduced, the manufacturing cost is reduced and the weight of the device is reduced.

At least one rotating shaft is applied and a seesaw type push button is implemented, so that it is possible to mechanically prevent a shift position different from driver's intention from being pushed.

However, the effect of the present disclosure is not limited to the above description and can be variously extended without departing from the scope and spirit of the present invention.

BRIEF DESCRIPTION OF THE DRAWINGS

FIG. 1 is a perspective view showing a button-type transmission control device according to an embodiment of the present disclosure;

FIG. 2A is a top exploded perspective view of the button-type transmission control device of FIG. 1 according to an embodiment of the present disclosure;

FIG. 2B is a bottom exploded perspective view of the button-type transmission control device of FIG. 1 according to an embodiment of the present disclosure;

FIG. 3 is a view showing a housing of the button-type transmission control device of FIG. 1 according to an embodiment of the present disclosure;

FIG. 4 is a view showing a button portion of the button-type transmission control device of FIG. 1 according to an embodiment of the present disclosure;

FIG. 5 is a view showing a hinge of the button-type transmission control device of FIG. 1 according to an embodiment of the present disclosure;

FIG. 6 is a view showing a button cover of the button-type transmission control device of FIG. 1 according to an embodiment of the present disclosure;

FIG. 7 is a view showing a button assembly cover of the button-type transmission control device of FIG. 1 according to an embodiment of the present disclosure;

FIG. 8 is a view showing a click plate of the button-type transmission control device of FIG. 1 according to an embodiment of the present disclosure;

FIG. 9 is a view showing a keypad of the button-type transmission control device of FIG. 1 according to an embodiment of the present disclosure;

FIG. 10 is a perspective view showing a button-type transmission control device according to another embodiment of the present invention according to an embodiment of the present disclosure;

FIG. 11A is a top exploded perspective view of the button-type transmission control device of FIG. 10 according to an embodiment of the present disclosure;

FIG. 11B is a bottom exploded perspective view of the button-type transmission control device of FIG. 10 according to an embodiment of the present disclosure;

FIG. 12 is a view showing a housing of the button-type transmission control device of FIG. 10 according to an embodiment of the present disclosure;

FIG. 13 is a view showing a button portion of the button-type transmission control device of FIG. 10 according to an embodiment of the present disclosure;

FIG. 14 is a view showing a hinge of the button-type transmission control device of FIG. 10 according to an embodiment of the present disclosure;

FIG. 15 is a view showing a button cover of the button-type transmission control device of FIG. 10 according to an embodiment of the present disclosure;

FIG. 16 is a view showing a button assembly cover of the button-type transmission control device of FIG. 10 according to an embodiment of the present disclosure;

FIG. 17 is a view showing a click plate of the button-type transmission control device of FIG. 10 according to an embodiment of the present disclosure;

FIG. 18 is a view showing a keypad of the button-type transmission control device of FIG. 10 according to an embodiment of the present disclosure;

FIG. 19A is a plan view showing the button-type transmission control device according to the embodiment of the present invention of which a portion has been removed;

FIG. 19B is a view showing that a pressure has not been applied to a second area of the transmission control device shown in FIG. 19A according to an embodiment of the present disclosure; and FIG. 19C is a view showing that a pressure has been applied to the second area of the transmission control device shown in FIG. 19A according to an embodiment of the present disclosure.

DETAILED DESCRIPTION

Embodiments of the present disclosure will be described in more detail with reference to the accompanying drawings. In the components of the present disclosure, detailed descriptions of what can be clearly understood and easily carried into practice through prior art by those skilled in the art will be omitted to avoid making the subject matter of the present invention unclear.

Hereinafter, a button-type transmission control device according to an embodiment of the present disclosure will be described.

FIG. 1 is a perspective view showing a button-type transmission control device according to an embodiment of the present disclosure. A top perspective view of the button-type transmission control device according to the embodiment of the present disclosure is shown in (a) of FIG. 1. A bottom perspective view of the button-type transmission control device according to the embodiment of the present invention is shown in (b) of FIG. 1. FIG. 2A is a top exploded perspective view of the button-type transmission control device of FIG. 1. FIG. 2B is a bottom exploded perspective view of the button-type transmission control device of FIG. 1.

Referring to FIGS. 1, 2A, and 2B, the button-type transmission control device 100 according to the embodiment of the present disclosure may include a button portion 110, a hinge 130, and a substrate 1100.

The button portion 110 may include a first area 117 and a second area 118 different from the first area 117. The hinge 130 may be disposed under the button portion 110. The substrate 1100 may be disposed under the hinge 130. The substrate 1100 may include a first terminal placed under the first area 117 and a second terminal placed under the second area 118. When a pressure is applied to the first area 117, the button portion 110 is inclined such that the first area 117 descends with respect to the hinge 130, so that the first area 117 contacts the first terminal, and a gear shift position corresponding to the first terminal can be selected. When the pressure is applied to the second area 118, the button portion 110 is inclined such that the second area 118 descends with respect to the hinge 130, so that the second area 118 contacts the second terminal, and a gear shift position corresponding to the second terminal can be selected.

Also, the button-type transmission control device 100 according to the embodiment of the present disclosure may further include a housing 120, an elastic member 140, a button cover 150, a button assembly cover 160, a click plate 180, and a keypad 190.

The upper portion of the button portion 110 is exposed to the outside through a main hole 122 of the housing 120. The hinge 130 is disposed under the button portion 110. The elastic member 140 is disposed under the hinge 130. The button cover 150 is disposed under the elastic member 140. The button cover 150 can be coupled to the button portion 110. The button assembly cover 160 is disposed under the button cover 150. A plurality of click plates 180 are disposed under the button assembly cover 160. Then, the keypad 190 is disposed under the click plate 180. The substrate 1100 is disposed under the keypad 190. A housing support 1110 is disposed under the substrate 1100. Hereinafter, the above respective components will be described in detail.

<Housing 120 and Housing Support 1110>

FIG. 3 is a view showing the housing of the button-type transmission control device of FIG. 1. A top view of the housing is shown in (a) of FIG. 3. A bottom view of the housing is shown in (b) of FIG. 3.

Referring to FIGS. 1 to 3, the housing 120 is coupled to the housing support 1110, thereby receiving the button portion 110, the hinge 130, the elastic member 140, the button cover 150, the button assembly cover 160, the click plate 180, the keypad 190, and the substrate 1100. The housing 120, together with the button portion 110 and the housing support 1110, forms the external appearance of the button-type transmission control device 100 according to the embodiment of the present invention.

The housing 120 may include a housing base 121, a main hole 122, a housing outer side wall 123, a housing inner side wall 124, a housing hinge bar fixing groove 125, and a housing coupling portion 126.

The housing 120 may include the housing base 121 and may include the housing outer side wall 123 extending downward from each side end of the housing base 121.

The housing base 121 shows the upper external appearance of the housing 120. The housing base 121 may be formed as a flat surface, and in some embodiments may be formed as a surface including a curvature.

The housing base 121 may include a hole which allows the button portion 110 to be visible to the outside. Specifically, the housing base 121 may include the main hole 122 having a shape corresponding to a button base 111 of the button portion 110. In FIGS. 1 to 3 showing the embodiment, the button base 111 has a triangular shape, and the main hole 122 also has a triangular shape corresponding thereto. The triangular shape of the button base 111 means that three areas (button areas selected by a user) serve as a switch. According to the embodiment, the button base 111 may have various shapes including the triangular shape even when three areas serve as a switch. The shape of the button base 111 and the shape of the main hole 122 may not correspond to each other.

In the housing 120, the housing hinge bar fixing groove 125 having the open bottom thereof may be formed in the bottom surface of the housing base 121 adjacent to the main hole 122. A hinge bar 133 to be described below may be disposed in the housing hinge bar fixing groove 125.

The housing outer side wall 123 shows the side portion external appearance of the housing 120 and may extend downward from each side end of the housing base 121. According to the embodiment of the present disclosure, the outer side wall of the housing 120 may not exist. Specifically, if the housing support 1110 includes an outer side wall serving as the housing outer side wall 123, the housing outer side wall 123 does not exist and only the housing base 121 may exist.

The housing 120 may include a housing inner side wall 124 which is adjacent to the main hole 122 and has a shape corresponding to the main hole 122. The housing inner side wall 124 may protrude downward from the bottom surface of the housing base 121. The housing inner side wall 124 can receive the button portion 110, the hinge 130, the elastic member 140, the button cover 150, the button assembly cover 160, the click plate 180, etc., and can allow the received components to stably operate by limiting the movements of the received components.

The housing inner side wall 124 may be formed to correspond to the main hole 122. However, the housing inner side wall 124 is not limited to this. The shape of the housing inner side wall 124 may be formed so as not to correspond to the shape of the main hole 122 as long as the received components can stably operate. According to the embodiment, at least one of the housing inner side wall 124, the main hole 122, and the button base 111 may be formed so as not to correspond to each other.

The housing 120 may be fastened to the housing support 1110 through the housing coupling portion 126. This can be performed by various methods including bolts.

The housing support 1110 may include a support drain hole 1113 and a support drain hole side wall 1115. The support drain hole 1113 and the support drain hole side wall 1115 may be disposed under a keypad drain hole 195 and a substrate drain hole 1103 which are described below.

The support drain hole side wall 1115 may be connected to a below-described hole side wall 168 of the button assembly cover 160. The support drain hole 1113 can outwardly discharge water or beverage introduced into an assembly base drain hole 167 of the button assembly cover 160.

The support drain hole side wall 1115 may be formed to protrude upward around the support drain hole 1113 in such a way as to be coupled to the hole side wall 168. The portions where the hole side wall 168 and the support drain hole side wall 1115 are coupled to each other are arranged to be overlapped with each other, lest water or beverage should leak out between the hole side wall 168 and the support drain hole side wall 1115.

<Button Portion 110>

FIG. 4 is a view showing the button portion of the button-type transmission control device of FIG. 1. A top view of the button portion is shown in (a) of FIG. 4. A bottom view of the button portion is shown in (b) of FIG. 4.

FIG. 5 is a view showing the hinge of the button-type transmission control device of FIG. 1.

Referring to FIGS. 4 and 5, the button portion 110 may include the button base 111, a button side wall 112, a hinge groove 113, a button side wall catching portion 114, a button base groove 115, and a button barrier wall 116. The button portion 110 can be coupled to the button cover 150 described below.

The button portion 110 may include the first area 117 and the second area 118 different from the first area 117. Specifically, the button portion 110 may include the button base 111 including the first area 117 and the second area 118.

The button base 111 shows the upper external appearance of the button portion 110. The button base 111 may be formed as a flat surface, and in some embodiments may be formed as a surface including a curvature. The button base 111 may be exposed to the outside through the main hole 122 of the housing 120.

The first area 117 and the second area 118 of the button base 111 mean areas (button areas that the user selects) serving as a switch. For example, when the first area 117 of the transmission control device 100 corresponds to the D shift position and the second area 118 corresponds to the N shift position, the user can select the D shift position by pressing the first area 117 (applying a pressure), and can select the N shift position by pressing the second area 118.

In FIG. 4, the button base 111 has a triangular shape, and the triangular shape of the button base 111 means that three areas (button areas that the user selects) serve as a switch. However, according to the embodiment, the button base 111 may have various shapes including the triangle shape even when three areas serve as a switch.

The button base groove 115 having the open bottom thereof may be formed in the middle portion of the bottom surface of the button base 111. A hinge body 131 may be disposed in the button base groove 115. The shape of the button base groove 115 may correspond to the shape of the hinge body 131. Specifically, the button base groove 115 may have a hemispherical shape, and the hinge body 131 may have a spherical shape corresponding to the hemispherical shape. In the case where the shape of the button base groove 115 and the shape of the hinge body 131 correspond to each other, when the user applies a pressure to the first area 117 of the button portion 110, the first area 117 of the button portion 110 can be smoothly inclined. However, the shape of the button base groove 115 and the shape of the hinge body 131 do not necessarily correspond to each other. The shapes can be determined differently according to the embodiment.

A button barrier wall 116 protruding downward may be formed at positions of the bottom surface of the button base 111, which correspond to the first area 117 and the second area 118. The button barrier wall 116 is connected to a below-described button cover barrier wall hole 153 to prevent light emitted from a light emitting device (not shown) disposed on the substrate 1100 from leaking. In FIG. 4, the button barrier wall 116 has a quadrangular shape which has an open bottom and protrudes downward. However, the shape of the button barrier wall 116 is not limited to this. The button barrier wall 116 can have any shape capable of preventing the light emitted from the light emitting device from leaking.

The button base 111 may include the button side walls 112 extending downward from respective side ends thereof.

Each of the button side walls 112 may include the hinge groove 113. The hinge groove 113 may be located between the first area 117 and the second area 118 of the button base 111. Specifically, the hinge groove 113 may have a long shape in the up and down direction. The hinge groove 113 may be formed in the button side wall 112 and have an open bottom. The hinge groove 113 may be located in the middle portion of the button side wall 112. The hinge bar 133 may be inserted into the hinge groove 113.

Each of the button side walls 112 may include one or more button side wall catching portions 114. While the button side wall catching portion 114 shown in FIG. 4 is shown as a protrusion, it is not necessarily limited to this. The button side wall catching portion 114 may be a fastening portion having a hole. The button side wall catching portion 114 can be fastened to a below-described button cover catching portion 152.

<Hinge 130>

Referring back to FIG. 5, the hinge 130 may include the hinge body 131 and a plurality of hinge bars 133. The hinge 130 may be disposed under the button portion 110. The hinge body 131 is disposed in the button base groove 115 and functions as the center of the button portion 110. When the user applies a pressure to an area (e.g., the first area 117) serving as a switch of the button portion 110 and the button portion 110 is inclined (the button portion 110 is rotated), the plurality of hinge bars 133 function to prevent a specific area from being rotated.

The hinge body 131 may be spherical or polyhedral. The shape of the hinge body 131 and the shape of the button base groove 115 may correspond to each other. However, the shape of the hinge body 131 and the shape of the button base groove 115 are not limited to this and can be varied according to the embodiment.

The plurality of hinge bars 133 may be formed on the hinge body 131 and may protrude from the center of the hinge body 131 in a direction perpendicular to the button side wall 112. The plurality of hinge bars 133 may be formed on the hinge body 131 at regular intervals.

At least one of the plurality of hinge bars 133 can be inserted into the hinge groove 113, and the hinge bar 133 is supported from the bottom and cannot be moved even if a pressure is applied to the upper portion of the hinge groove 113. Specifically, in the embodiment shown in FIG. 5, three hinge bars 133 are provided and can be inserted respectively into the hinge grooves 113 formed in three button side walls 112 of the triangular button portion 110.

The hinge bar 133 is disposed in the housing hinge bar fixing groove 125 there over and in a below-described assembly hinge bar fixing groove 163 thereunder, so that the movement of the hinge bar 133 can be limited. According to the embodiment of the present disclosure, the shape of the housing hinge bar fixing groove 125 and the shape of the assembly hinge bar fixing groove 163 may be varied according to any configuration capable of fixing the hinge bar 133. The configuration capable of fixing the hinge bar 133 can be formed only in any one of the housing 120 and the below-described button assembly cover 160.

The hinge bar 133 can serve as a rotating shaft together with the hinge body 131 when the user applies a force to an area (e.g., the first area 117) of the button portion 110, which serves as a switch. According to the embodiment of the present disclosure, it is possible to implement a seesaw type push button by applying the plurality of hinge bars 133, that is, one or more rotating shaft, thereby mechanically preventing a shift position different from driver's intention from being pushed.

The seesaw type push button uses an operating principle in which when the user applies a pressure to the first area 117 of the button portion 110, the first area 117 descends (rotates downward) with respect to the hinge 130, and another area of the button portion 110 ascends (rotates upward) with respect to the hinge 130.

<Elastic Member 140>

The elastic member 140 may be disposed under the hinge 130. A spring can be generally used as the elastic member 140, and any configuration capable of providing an elastic force (restoring force) can be used as the elastic member 140.

A predetermined gap may be created between the hinge 130 and the below-described button cover 150. Since the elastic member 140 maintains a constant load, it is possible to prevent free movement due to the gap and noise due to vibration.

<Button Cover 150>

FIG. 6 is a view showing the button cover of the button-type transmission control device of FIG. 1. A top view of the button cover is shown in (a) of FIG. 6. A bottom view of the button cover is shown in (b) of FIG. 6.

Referring to FIG. 6, the button cover 150 may include a button cover base 151, the button cover catching portion 152, the button cover barrier wall hole 153, an elastic member fixing portion 154, and a button cover protrusion 155. The button cover 150 may be disposed under the elastic member 140 and may be coupled to the button portion 110.

The button cover base 151 may be formed as a flat surface, and in some embodiments may be formed as a surface including a curvature.

The button cover base 151 may have a shape corresponding to the button base 111. Specifically, when the button base 111 is triangular, the button cover base 151 may also have a triangular shape corresponding to the shape of the button base 111. When the shape of the button cover base 151 corresponds to the shape of the button base 111, the button cover 150 can be easily coupled to the button portion 110. According to the embodiment, if a configuration which makes it easier to couple the button cover 150 to the button portion 110 is added, the shape of the button cover base 151 and the shape of the button base 111 may be different from each other.

The elastic member fixing portion 154 may be formed in the middle portion of the top surface of the button cover base 151. The elastic member 140 may be disposed in the elastic member fixing portion 154. The hinge 130 is disposed on the elastic member 140, and the elastic member fixing portion 154 is formed under the elastic member 140

The button cover base 151 may include one or more button cover catching portions 152 formed at each side end of the button cover base 151. The button cover catching portion 152 and the button side wall catching portion 114 may be fastened to each other. Two button cover catching portion 152 are, as shown in FIG. 6, formed on each side end of the button cover base 151. However, one button cover catching portion 152 may be formed.

The button cover catching portion 152 is formed to have a central hole. However, the button cover catching portion 152 is not necessarily limited to this. The button cover catching portion 152 may be formed to have a protrusion. Specifically, the button side wall catching portion 114 has a protrusion structure and the button cover catching portion 152 is formed as a fastening portion having a central hole, and then the button side wall catching portion 114 and the button cover catching portion 152 can be fastened to each other. According to the embodiment, the button side wall catching portion 114 is formed as a fastening portion having a central hole and the button cover catching portion 152 has a protrusion structure, and then the button side wall catching portion 114 and the button cover catching portion 152 can be fastened to each other. In addition to this, they can be fastened to each other by various shapes and structures.

The button cover barrier wall hole 153 protruding downward may be formed at the positions of the button cover base 151, which correspond to the first area 117 and the second area 118.

The button cover barrier wall hole 153 is connected to the button barrier wall 116, so that the light emitted from the light emitting device disposed on the substrate 1100 does not leak and reaches an area that serves as a switch of the button base 111 (e.g., the first area 117).

The button cover barrier wall hole 153 shown in FIG. 6 has a quadrangular shape which has open top and bottom and protrudes downward. However, the shape of the button cover barrier wall hole 153 is not limited to this. The button cover barrier wall hole 153 can have any shape capable of preventing light emitted from the light emitting device from leaking.

The button cover barrier wall hole 153 and the button barrier wall 116 are connected to each other. Therefore, when the button cover barrier wall hole 153 and the button barrier wall 116 have the same shape, light can be prevented from leaking. However, it is possible for the button cover barrier wall hole 153 and the button barrier wall 116 to have different shapes as long as the button cover barrier wall hole 153 and the button barrier wall 116 are connected to each other to prevent light from leaking.

The button cover protrusion 155 protruding downward may be formed at each corner on the bottom surface of the button cover base 151. The below-described click plate 180 may be disposed under the button cover protrusion 155. When the user applies a force to the area (e.g., the first area 117) of the button base 111, which serves as a switch, the applied force is transferred to the click plate 180 through the button cover protrusion 155 and the click plate 180 moves. The button cover protrusion 155 shown in FIG. 6 has a shape protruding downward. However, according to the embodiment, the button cover protrusion 155 may have a groove structure having an open bottom.

<Button Assembly Cover 160>

FIG. 7 is a view showing the button assembly cover of the button-type transmission control device of FIG. 1. A top view of the button assembly cover is shown in (a) of FIG. 7. A bottom view of the button assembly cover is shown in (b) of FIG. 7.

Referring to FIG. 7, the button assembly cover 160 may include an assembly base 161, an assembly side wall 162, an assembly hinge bar fixing groove 163, a click plate through-hole 164, a barrier wall through-hole 165, an assembly side wall groove 166, an assembly base drain hole 167, a hole side wall 168, and an assembly side wall protrusion 169. The button assembly cover 160 may be disposed under the button cover 150.

The button assembly cover 160 may include the assembly base 161 corresponding to the shape of the button base 111. The assembly base 161 may be formed as a flat surface, and in some embodiments may be formed as a surface including a curvature.

The assembly base 161 may have a shape corresponding to the button base 111 and/or the button cover base 151. The assembly base 161 shown in FIG. 7 is triangular in correspondence with the button base 111 and the button cover base 151. However, the shape of the assembly base 161 can be determined differently from that of the button base 111 and/or the button cover base 151.

The assembly base 161 may include the assembly side wall 162 extending upward and downward from each side end of the assembly base 161. The assembly side wall 162 may extend upward from the respective side ends of the assembly base 161 and may extend upward and downward.

The assembly side wall 162 extending upward from the respective side ends of the assembly base 161 may surround the button cover 150. By doing so, the movements of the button portion 110 and the button cover 150 can be limited.

The assembly hinge bar fixing groove 163 having an open top may be formed on the top surface of the assembly side wall 162. The hinge bar 133 may be disposed in the assembly hinge bar fixing groove 163. The hinge bar 133 is disposed in the assembly hinge bar fixing groove 163 and can be supported by the assembly side wall 162.

In the assembly base 161, the click plate through-hole 164 may be formed under the first area 117 and the second area 118. The below-described click plate 180 may pass through the click plate through-hole 164. The shape of the click plate through-hole 164 may be determined to correspond to the shape of the click plate 180 passing there through. Specifically, when the click plate 180 has a cylindrical shape, the click plate through-hole 164 may have a circular shape.

In the assembly base 161, the barrier wall through-hole 165 may be formed adjacent to the click plate through-hole 164. The button cover barrier wall hole 153 may be inserted into the barrier wall through-hole 165. Although the barrier wall through-hole 165 shown in FIG. 7 has a quadrangular shape, the barrier wall through-hole 165 is not necessarily limited to this and can be determined differently. However, it is possible to limit the movement of the button cover 150 by making the shape of the barrier wall through-hole 165 correspond to the shape of the button cover barrier wall hole 153.

The assembly base drain hole 167 may be formed in the middle of the assembly base 161. The hole side wall 168 protruding downward may be formed around the assembly base drain hole 167 of the bottom surface of the assembly base 161. The hole side wall 168 may pass through the below-described keypad 190 and substrate 1100 and be fixed to the housing support 1110.

When water or beverage flows into the transmission control device, the assembly base drain hole 167 can function as a passage for discharging the water or beverage downward. The assembly base 161 may be formed as a flat surface. Additionally, according to the embodiment, in order for the water or beverage to be well discharged, the assembly base 161 may be formed as an inclined surface having the assembly base drain hole 167 as the lowest point. The hole side wall 168 may pass through the below-described keypad drain hole 195 of the keypad 190 and the substrate drain hole 1103 of the substrate 1100, and may be connected to the support drain hole side wall 1115 of the of the housing support 1110. The hole side wall 168 and the support drain hole side wall 1115 can be coupled lest the water or beverage should leak between the hole side wall 168 and the support drain hole side wall 1115. For example, the portions where the hole side wall 168 and the support drain hole side wall 1115 are coupled to each other are arranged to be overlapped with each other, lest water or beverage should leak out.

A plurality of assembly side wall grooves 166 may be formed in the inner sides of the assembly side walls 162 extending upward from the respective side ends of the assembly base 161. The assembly side wall groove 166 may be formed to have a predetermined length in the longitudinal direction of the assembly side wall 162. The button cover catching portion 152 may be disposed in the assembly side wall groove 166. The shape of the assembly side wall groove 166 may correspond to the shape of the button cover catching portion 152.

The assembly side wall protrusion 169 may be formed on the middle portion of the bottom surface of the assembly side wall 162 extending downward from the respective side ends of the assembly base 161. The assembly side wall protrusion 169 can serve as a support for the button assembly cover 160. The shape of the assembly side wall projection 169 is not particularly limited.

<Click Plate 180>

FIG. 8 is a view showing the click plate 180 of the button-type transmission control device of FIG. 1. A top view of the click plate 180 is shown in (a) of FIG. 8. A bottom view of the click plate 180 is shown in (b) of FIG. 8.

Referring to FIG. 8, the click plate 180 may include a click plate column 181, a click plate board 183, and a click plate protrusion 187. The click plate 180 may be disposed under the button assembly cover 160, and the click plate column 181 may pass through the click plate through-hole 164.

The click plate 180 can transmit the pressure applied to the first area 117 or the second area 118 of the button portion 110 to the below-described first terminal (not shown) or the second terminal (not shown) of the substrate 1100. Specifically, the click plate 180 serves to transmit the force or pressure transmitted from above to the keypad 190 described below. When the user applies a force to the area (e.g., the first area 117) of the button base 111, which serves as a switch, the applied force is transferred to the click plate 180 through the button cover 150 and then the click plate 180 moves vertically and presses a below-described keypad contact portion 191. In other words, the click plate 180 turns vertically when the button portion 110 is rotated, and vertically presses the keypad contact portion.

The click plate board 183 may be a circular board or a polygonal board.

The click plate column 181 may be a circular column or a polygonal column and may be formed to protrude from one side of the click plate board 183 in a direction.

In the click plate column 181 shown in FIG. 8, a first cylinder protrudes from the click plate board 183. A plurality of quadrangular columns formed around the first cylinder are connected to the first cylinder. A second cylinder protrudes upward from the first cylinder. The click plate column 181 includes the first cylinder, the quadrangular column connected to the first cylinder, and the second cylinder. The click plate column 181 may be formed in other various ways.

The click plate 180 may include a ring damper 185. Specifically, the click plate column 181 may include the ring damper 185. When the click plate 180 moves vertically downward and then moves to its original position, the tension of the ring damper 185 assembled to the click plate 180 can prevent an impact sound and causes the click plate 180 to smoothly move. The click plate 180 which moves to its original position can also cause the button cover 150 coupled with the button portion 110 to move its original position by pushing out the button cover 150.

The click plate 180 shown in FIG. 8 includes the click plate column 181 and click plate board 183. However, according to the embodiment, the click plate 180 may be formed of only the click plate column 181 without the click plate board 183. The click plate 180 may have a circular cylindrical shape or a polygonal cylindrical shape. The click plate 180 may pass through the click plate through-hole 164. The click plate 180 can transmit the pressure applied to the first area 117 or the second area 118 of the button portion 110 to the below-described first terminal or the second terminal.

The click plate board 183 and the click plate 180 without the click plate board 183 may include one or more click plate protrusions 187.

The click plate protrusion 187 may protrude from the bottom surface of the click plate board 183 in a direction opposite to the click plate column 181. In the click plate 180 without the click plate board 183, the click plate protrusion 187 may protrude from one side of the click plate 180.

<Keypad 190>

FIG. 9 is a view showing the keypad of the button-type transmission control device of FIG. 1. A top view of the keypad is shown in (a) of FIG. 9. A bottom view of the keypad is shown in (b) of FIG. 9.

Referring to FIG. 9, the keypad 190 may include the keypad contact portion 191, a keypad barrier wall hole 193, and a keypad drain hole 195. The keypad 190 may be disposed under the click plate 180. The keypad 190 can transmit the pressure transmitted to the click plate 180 to the below-described first terminal or the second terminal of the substrate 1100.

The keypad 190 may include one or more keypad contact portions 191. The one or more keypad contact portions 191 may be formed at a position corresponding to the click plate 180. When the click plate protrusion 187 exists, the keypad contact portion 191 may be formed under the click plate protrusion 187. The keypad contact portion 191 can transmit the pressure transmitted to the click plate 180 to the first terminal or the second terminal of the substrate 1100.

The keypad contact portion 191 may include one or more hemispherical or polygonal column shapes protruding upward.

The keypad contact portion 191 may be made of rubber. The keypad contact portion 191 tends to return to its original state due to the characteristic of the rubber. The click plate 180 which has moved downward can move from the bottom to the top (original position) by the return force of the rubber.

The keypad contact portion 191 may include a conductive contact base material (not shown). The conductive contact base material may include a gold plated contact base material or a silver plated contact base material.

When the click plate 180 moves from top to bottom, the rubber-made keypad contact portion 191 can also move from top to bottom. Here, the conductive contact base material of the keypad contact portion 191 comes in contact with the below-described contact portion (for example, the first terminal or the second terminal) of the substrate 1100, so that the terminals are connected to each other. Through the connection between the terminals, a signal of the shift position desired by the user can be output and the light can be emitted from the below-described light-emitting device.

The keypad 190 may include one or more keypad barrier wall holes 193. The one or more keypad wall holes 193 may be disposed under the barrier wall through-hole 165 or the button cover barrier wall hole 153. The light emitting device may be disposed under the keypad barrier wall hole 193. The keypad barrier wall hole 193 may protrude upward from the keypad 190. A wave shape is applied to the portion protruding upward from the keypad 190, thereby ensuring durability quality through fatigue dispersion by tension.

The light emitted from the light emitting device reaches symbols, characters, shapes, etc., marked on the first area 117 of the button base 111 through the keypad barrier wall hole 193, the button cover barrier wall hole 153, and the button barrier wall 116. Then, through this, the driver can effectively recognize the selected shift position.

The button cover coupled with the button portion 110 rotates with respect to the hinge 130 by user's selection of first area 117. During the rotation, the button cover coupled with the button portion 110 may have different fixing points. Here, the light emitted from the light emitting device may leak. In order to prevent the occurrence of the light leakage, the button cover barrier wall hole 153 is brought close to the light emitting device, and the button cover barrier wall hole 153 and the keypad barrier wall hole 193 are intended to be overlapped with each other. As a result, it is possible to prevent the light from leaking.

The keypad 190 may include the keypad drain hole 195. The keypad drain hole 195 may be formed under the assembly base drain hole 167 of the button assembly cover 160. The hole side wall 168 can pass through the keypad drain hole 195.

<Substrate 1100>

Referring to FIG. 2A, the substrate 1100 may be disposed under the button portion 110 or under the keypad 190.

The substrate 1100 may include the first terminal (not shown) placed under the first area 117, the second terminal (not shown) placed under the second area 118, one or more light emitting devices (not shown), and a substrate drain hole 1103.

When the pressure is applied to the first area 117, the button portion 110 is inclined (rotated) such that the first area 117 descends with respect to the hinge 130, so that the first area 117 contacts the first terminal, and a gear shift position corresponding to the first terminal can be selected. When the pressure is applied to the second area 118, the button portion 110 is inclined (rotated) such that the second area 118 descends with respect to the hinge 130, so that the second area 118 contacts the second terminal, and a gear shift position corresponding to the second terminal can be selected. What the first area 117 or the second area 118 contacts the first terminal or the second terminal means that the first area 117 or the second area 118 contacts the first terminal or the second terminal through the button cover 150, the click plate 180, and the keypad 190.

The first terminal and the second terminal may be formed at a position corresponding to the click plate 180.

When the click plate 180 moves from top to bottom, the rubber-made keypad contact portion 191 also moves from top to bottom. Here, the conductive contact base material of the keypad contact portion 191 comes in contact with the first terminal or the second terminal of the substrate 1100 to make connection between the terminals. The connection between the terminals enables a signal of the shift position desired by the user to be output.

One or more light emitting devices may be disposed on the substrate 1100. Specifically, the light emitting device may be formed at positions corresponding to the first area 117 and the second area 118, at a position corresponding to the button barrier wall 116, or at a position corresponding to the button cover barrier wall hole 153.

When the click plate 180 moves from top to bottom, the rubber-made keypad contact portion 191 also moves from top to bottom. Here, the conductive contact base material of the keypad contact portion 191 comes in contact with the first terminal or the second terminal to make connection between the terminals. The connection between the terminals allows the light emitting device to emit light.

When the user presses the first area 117 of the button portion 110, a shift position desired by the user is selected and the light emitted from the light emitting device reaches symbols, characters, shapes, etc., marked on the first area 117 of the button base 111 through the keypad barrier wall hole 193, the button cover barrier wall hole 153, and the button barrier wall 116. Then, through this, the driver can effectively recognize the selected shift position.

The substrate 1100 may include the substrate drain hole 1103. The substrate drain hole 1103 may be formed under the keypad drain hole 195 of the keypad 190. The hole side wall 168 of the button assembly cover 160 can pass through the substrate drain hole 1103.

The housing support 1110 may be disposed under the substrate 1100. The housing support 1110 can be coupled to the housing 120.

FIG. 10 is a perspective view showing a button-type transmission control device according to another embodiment of the present disclosure. A top perspective view of the button-type transmission control device according to the embodiment of the present invention is shown in (a) of FIG. 10. A bottom perspective view of the button-type transmission control device according to the embodiment of the present invention is shown in (b) of FIG. 10. FIG. 11A is a top exploded perspective view of the button-type transmission control device of FIG. 10. FIG. 11B is a bottom exploded perspective view of the button-type transmission control device of FIG. 10.

Referring to FIGS. 10, 11A and 11B, the button-type transmission control device 300 according to the embodiment of the present disclosure includes a button portion 310, a housing 320, a hinge 330, an elastic member 340, a button cover 350, a button assembly cover 360, a click plate 380, a keypad 390, and a substrate 3100.

The configuration of the button-type transmission control device 300 according to the embodiment of the present disclosure is similar to that of the button-type transmission control device 100 according to the embodiment of the present disclosure. In the following description of the button-type transmission control device 300 according to the embodiment of the present disclosure, configuration or part different from that of the button-type transmission control device 100 according to the embodiment of the present disclosure will be described in detail, and the configuration or part the same as or similar to that of the button-type transmission control device 100 will be replaced by the description of the button-type transmission control device 100 according to the embodiment.

FIG. 12 is a view showing a housing of the button-type transmission control device of FIG. 10. FIG. 13 is a view showing a button portion of the button-type transmission control device of FIG. 10. FIG. 14 is a view showing a hinge of the button-type transmission control device of FIG. 10. FIG. 15 is a view showing a button cover of the button-type transmission control device of FIG. 10. FIG. 16 is a view showing a button assembly cover of the button-type transmission control device of FIG. 10. FIG. 17 is a view showing a click plate of the button-type transmission control device of FIG. 10. FIG. 18 is a view showing a keypad of the button-type transmission control device of FIG. 10.

<Housing 320> and <Button Portion 310>

Referring to FIGS. 12 and 13, the housing base 321 may include a hole which allows the button portion 310 to be visible to the outside. Specifically, the housing base 321 may include a main hole 322 having a shape corresponding to a button base 311 of the button portion 310. In FIGS. 11 to 13 showing the embodiment, the button base 311 has a quadrangular shape, and the main hole 322 also has a quadrangular shape corresponding thereto. The quadrangular shape of the button base 311 means that four areas (button areas that a user selects) serve as a switch. According to the embodiment, the button base 311 may have various shapes including the quadrangular shape even when four areas serve as a switch. The shape of the button base 311 and the shape of the main hole 322 may not correspond to each other.

A first area 317 and a second area 318 of the button base 311 mean areas (button areas that the user selects) serving as a switch. For example, when the first area 317 of the transmission control device 100 corresponds to the D shift position and the second area 318 corresponds to the N shift position, the user can select the D shift position by pressing the first area 317 (applying a pressure), and can select the N shift position by pressing the second area 318.

A total of four hinge grooves 313 of the button portion 310 are shown in FIG. 13.

<Hinge 330>

Referring to FIG. 14, there are four hinge bars 333, and the hinge bars 333 can be inserted respectively into the hinge grooves 313 formed in four button side walls 312 of the quadrangular button portion 310.

The hinge bar 333 can serve as a rotating shaft together with a hinge body 331 when the user applies a force to an area (e.g., the first area 317) of the button portion 310, which serves as a switch. According to the embodiment of the present invention, it is possible to implement a seesaw type push button by applying the plurality of hinge bars 333, that is, one or more rotating shaft, thereby mechanically preventing a shift position different from driver's intention from being pushed.

<Button Cover 350>

Referring to FIG. 15, a button cover base 351 may have a shape corresponding to the button base 311. Specifically, when the button base 311 is quadrangular, the button cover base 351 may also have a quadrangular shape corresponding to the shape of the button base 311. When the shape of the button cover base 351 corresponds to the shape of the button base 311, the button cover 350 can be easily coupled to the button portion 310. According to the embodiment, if a configuration which makes it easier to couple the button cover 350 to the button portion 310 is added, the shape of the button cover base 351 and the shape of the button base 311 may be different from each other.

<Button Assembly Cover 360>

Referring to FIG. 16, an assembly base 361 may have a shape corresponding to the button base 311 and/or the button cover base 351. The assembly base 361 shown in FIG. 16 is quadrangular in correspondence with the button base 311 and the button cover base 351. However, the shape of the assembly base 361 can be determined differently from that of the button base 311 and/or the button cover base 351.

There are a total of four click plate through-holes 364 shown in FIG. 16 in the assembly base 361.

<Click Plate 380>

Referring to FIG. 17, the click plate 380 may include a click plate column 381, a click plate board 383, and a click plate protrusion 387.

The click plate board 383 may be a circular board, a polygonal board or a board including a curve.

The click plate column 381 may be a circular column or a polygonal column and may be formed to protrude from one side of the click plate board 383 in a direction.

In the click plate column 381 shown in FIG. 17, a first cylinder protrudes from the click plate board 383. A quadrangular column formed on both sides of the first cylinder is connected to the first cylinder. A second cylinder protrudes upward from the first cylinder. The click plate column 381 includes the first cylinder, the quadrangular column connected to the first cylinder, and the second cylinder. The click plate column 381 may be formed in other various ways.

The click plate 380 shown in FIG. 17 includes the click plate column 381 and click plate board 33. However, according to the embodiment, the click plate 30 may be formed of only the click plate column 381 without the click plate board 383. The click plate 380 may have a circular cylindrical shape or a polygonal cylindrical shape. The click plate 380 may pass through the click plate through-hole 364.

The click plate board 383 and the click plate 380 without the click plate board 383 may include one or more click plate protrusions 387.

The click plate protrusion 387 may protrude from the bottom surface of the click plate board 383 in a direction opposite to the click plate column 381. In the click plate 380 without the click plate board 383, the click plate protrusion 387 may protrude from one side of the click plate 380.

<Keypad 390>

Referring to FIG. 18, the keypad 390 may include one or more keypad contact portions 391 and at least one keypad barrier wall hole 393. The one or more keypad contact portions 391 may be formed at a position corresponding to the click plate 380 and the one or more keypad barrier wall holes 393 may be formed under a barrier wall through-hole 365 or a button cover barrier wall hole 353.

<Substrate 3100>

Referring to FIG. 11A, the substrate 3100 may be disposed under the button portion 310 or under the keypad 390.

The substrate 3100 may include a first terminal (not shown) placed under the first area 317, a second terminal (not shown) placed under the second area 318, and one or more light emitting devices (not shown). The first terminal and the second terminal may be formed at positions corresponding to the click plate 380. The light emitting device may be formed at a position corresponding to the first area 317 and the second area 318, at a position corresponding to a button barrier wall 316, or at a position corresponding to the button cover barrier wall hole 353.

As described above, the button-type transmission control devices 100 and 300 according to the embodiments of the present invention have been described by taking examples in which three or four hinge bars 133 and 333 are provided. However, the present invention is not limited to this. A case where two hinge bars are provided (only the first area and the second area exist) can be also included in the present invention.

The button-type transmission control devices 100 and 300 according to the embodiments of the present invention can minimize the number of parts constituting the button-type transmission control device, thereby reducing the size thereof and increasing the utilization of the space. Also, the number of parts is reduced, so that the manufacturing cost is reduced and the weight of the device is reduced. Further, according to the embodiment of the present invention, a seesaw type push button is implemented by applying one or more rotating shafts to one button, so that it is possible to mechanically prevent a shift position different from driver's intention from being pushed.

FIG. 19A is a plan view showing the button-type transmission control device 100 according to the embodiment of the present disclosure of which a portion has been removed. FIG. 19B is a view showing that a pressure has not been applied to the second area of the transmission control device 100 shown in FIG. 19A. FIG. 19C is a view showing that a pressure has been applied to the second area of the transmission control device 100 shown in FIG. 19A.

The operating principle of the seesaw type push button will be described with reference to FIGS. 19A to 19C. For example, when the user applies a pressure to the second area 118 of the button portion 110, the second area 118 descends (rotates downward) with respect to the hinge 130, and another area of the button portion 110 ascends (rotates upward) with respect to the hinge 130. Here, since the hinge bar 133 is supported from the bottom, the hinge bar 133 does not move downward. Specifically, as shown in FIG. 19A, the second area 118 is rotated downward about a line connecting two supporting points at which two hinge bars 133a and 133b adjacent to the second area 118 are supported from the bottom, that is to say, about a line (A-A') connecting two assembly hinge bar fixing grooves 163 corresponding to the two hinge bars 133 adjacent to the second area 118, and remaining areas other than the second area are rotated upward. Here, the hinge groove 113 has a long shape in the vertical direction. Therefore, regarding the two hinge grooves 113 adjacent to the second area 118 to which the pressure has been applied, the hinge bars 133a and 133b are positioned in the upper portion of the hinge groove 113. Regarding the hinge groove 113 which is not adjacent to the second area 118 to which the pressure has been applied, the hinge bar 133c is positioned in the lower portion of the hinge groove 113 because the button portion 110 rotates upward in the corresponding area. As a result, the button cover protrusion 155 disposed under the second area 118 among the button cover protrusions 155 formed on the bottom surface of the button cover 150 moves downward and comes in contact with the click plate 180 disposed under the button cover protrusion 155.

More specifically, the click plate 180 disposed under the button cover 150 moves downward by the rotation of the button portion 110 and the button cover 150 and transmits the pressure to the keypad contact portion 191 of the keypad 190. The conductive contact base material of the keypad contact portion 191 which has received the pressure descends and comes in contact with the first terminal of the substrate 1100 disposed under the keypad 190 to make connection between the terminals. Through the connection between the terminals, the shift position desired by the user is selected and light is emitted from the light emitting device disposed on the substrate 1100.

The features, structures and effects and the like described in the embodiments are included in at least one embodiment of the present disclosure and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although the embodiments of the present disclosure were described above, these are just examples and do not limit the present disclosure. Further, the present disclosure may be changed and modified in various ways, without departing from the essential features of the present disclosure, by those skilled in the art. For example, the components described in detail in the embodiments of the present invention may be modified. Further, differences due to the modification and application should be construed as being included in the scope and spirit of the present disclosure, which is described in the accompanying claims.

What is claimed is:

1. A button-type transmission control device comprising:
a button portion which comprises a first area and a second area different from the first area;
a hinge which is disposed under the button portion; and
a substrate which is disposed under the hinge,
wherein the substrate comprises a first terminal placed under the first area and a second terminal placed under the second area,
wherein, when a pressure is applied to the first area, the button portion is inclined such that the first area descends with respect to the hinge, so that the first area contacts the first terminal, and a gear shift position corresponding to the first terminal is selected,
and wherein, when a pressure is applied to the second area, the button portion is inclined such that the second area descends with respect to the hinge, so that the second area contacts the second terminal, and a gear shift position corresponding to the second terminal is selected.

2. The button-type transmission control device of claim 1, wherein the hinge comprises a hinge body and a plurality of hinge bars,
wherein the button portion comprises a hinge groove located between the first area and the second area,
wherein at least one of the plurality of hinge bars is inserted into the hinge groove,
and wherein the hinge bar is supported from a bottom and is not moved downward even if a pressure is applied to an upper portion of the hinge groove.

3. The button-type transmission control device of claim 2, wherein the button portion comprises a button base comprising the first area and the second area,
wherein the button base comprises button side walls extending downward from respective side ends of the button base,
wherein the hinge groove is formed in the button side wall and has an open bottom thereof,
wherein the plurality of hinge bars are formed on the hinge body and protrude from a center of the hinge body in a direction perpendicular to the button side wall,
and wherein the plurality of hinge bars are formed on the hinge body at regular intervals.

4. The button-type transmission control device of claim 3, wherein a button base groove having an open bottom thereof is formed in a middle portion of a bottom surface of the button base,
and wherein the hinge body is spherical or polyhedral and is disposed in the button base groove.

5. The button-type transmission control device of claim 3, further comprising:
an elastic member which is disposed under the hinge; and
a button cover which is disposed under the elastic member and is coupled to the button portion,
wherein the button cover comprises a button cover base having a shape corresponding to the button base,
wherein an elastic member fixing portion is formed in a middle portion of a top surface of the button cover base,
and wherein the elastic member is disposed in the elastic member fixing portion.

6. The button-type transmission control device of claim 3, further comprising a button assembly cover which is disposed under the button portion,
wherein the button assembly cover comprises an assembly base corresponding to a shape of the button base,
wherein the assembly base comprises an assembly side wall extending upward from each side end of the assembly base,
wherein an assembly hinge bar fixing groove having an open top is formed on a top surface of the assembly side wall,
and wherein the hinge bar is disposed in the assembly hinge bar fixing groove and is supported.

7. The button-type transmission control device of claim 5, further comprising a button assembly cover which is disposed under the button cover,
wherein the button assembly cover comprises an assembly base corresponding to a shape of the button cover base,
wherein the assembly base comprises an assembly side wall extending upward from each side end of the assembly base,
and wherein the assembly side wall surrounds the button cover.

8. The button-type transmission control device of claim 6, further comprising a click plate which is disposed under the button assembly cover,
wherein, in the assembly base, a click plate through-hole is formed under the first area and the second area,
wherein the click plate has a circular cylindrical shape or a polygonal cylindrical shape,
wherein the click plate passes through the click plate through-hole,
and wherein the click plate transmits the pressure applied to the first area or the second area of the button portion to the first terminal or the second terminal.

9. The button-type transmission control device of claim 8, further comprising a keypad which is disposed under the click plate,
wherein the keypad comprises one or more keypad contact portions,
wherein the one or more keypad contact portions are formed at a position corresponding to the click plate,
wherein the substrate is disposed under the keypad,
wherein the first terminal and the second terminal are formed at a position corresponding to the click plate,
and wherein the keypad contact portion transmits the pressure transmitted to the click plate to the first terminal or the second terminal.

10. The button-type transmission control device of claim 8, wherein the click plate comprises a ring damper.

11. The button-type transmission control device of claim 9, wherein the keypad contact portion comprises one or more hemispherical or polygonal column shapes protruding upward.

12. The button-type transmission control device of claim 11, wherein the keypad contact portion is made of rubber.

13. The button-type transmission control device of claim 6, further comprising a click plate which is disposed under the button assembly cover,
wherein, in the assembly base, a click plate through-hole is formed under the first area and the second area,
wherein the click plate comprises a click plate column and a click plate board,
wherein the click plate board is a circular board or a polygonal board,
wherein the click plate column is a circular column or a polygonal column and is formed to protrude upward from one side of the click plate board,
wherein the click plate column passes through the click plate through-hole, and wherein the click plate transmits the pressure applied to the first area or the second area of the button portion to the first terminal or the second terminal.

14. The button-type transmission control device of claim 13, further comprising a keypad which is disposed under the click plate,
wherein the keypad comprises one or more keypad contact portions,
wherein the one or more keypad contact portions are formed at a position corresponding to the click plate,
wherein the substrate is disposed under the keypad,
wherein the first terminal and the second terminal are formed at a position corresponding to the click plate,
and wherein the keypad contact portion transmits the pressure transmitted to the click plate to the first terminal or the second terminal.

15. The button-type transmission control device of claim 13, wherein the click plate comprises a ring damper.

16. The button-type transmission control device of claim 14, wherein the keypad contact portion comprises one or more hemispherical or polygonal column shapes protruding upward.

17. The button-type transmission control device of claim 16, wherein the keypad contact portion is made of rubber.

18. The button-type transmission control device of claim 3,
wherein a button barrier wall protruding downward is formed at positions of a bottom surface of the button base, which correspond to the first area and the second area,
wherein the substrate further comprises one or more light emitting devices,
and wherein a light emitting device is formed at a position corresponding to the button barrier wall.

19. The button-type transmission control device of claim 5,
wherein a button cover barrier wall hole protruding downward is formed at positions of the button cover base, which correspond to the first area and the second area,
wherein the substrate further comprises one light emitting devices,
and wherein a light emitting device is formed at a position corresponding to the button cover barrier wall hole.

20. The button-type transmission control device of claim 19, further comprising a button assembly cover which is disposed under the button portion,
wherein the button assembly cover comprises an assembly base corresponding to a shape of the button cover base,
wherein, in the assembly base, a click plate through-hole is formed under the first area and the second area,
wherein, in the assembly base, a barrier wall through-hole is formed adjacent to the click plate through-hole,
and wherein the button cover barrier wall hole is inserted into the barrier wall through-hole.

21. The button-type transmission control device of claim 20, further comprising a keypad which is disposed on the substrate,
wherein the keypad further comprises one or more keypad barrier wall holes,
and wherein the keypad barrier wall hole is disposed under the barrier wall through-hole.

22. The button-type transmission control device of claim 18,
wherein the substrate further comprises one or more light emitting devices,
and wherein the one ore more light emitting devices are formed at positions corresponding to the first area and the second area.

23. The button-type transmission control device of claim 2, further comprising a housing,
wherein the housing comprises a housing base,
wherein the housing base comprises a main hole corresponding to a shape of the button base,
wherein a housing hinge bar fixing groove having an open bottom thereof is formed in a bottom surface of the housing base adjacent to the main hole,
and wherein the hinge bar is disposed in the housing hinge bar fixing groove.

24. The button-type transmission control device of claim 3, further comprising:
an elastic member which is disposed under the hinge; and
a button cover which is disposed under the elastic member and is coupled to the button portion,
wherein the button cover comprises a button cover base having a shape corresponding to the button base,
wherein each of the button side walls of the button portion comprises one or more button side wall catching portions,
wherein the button cover base comprises one or more button cover catching portions formed at each side end of the button cover base,
and wherein the button side wall catching portion and the button cover catching portion are fastened to each other.

25. The button-type transmission control device of claim 2, wherein, when the pressure is applied to the first area, the first area is rotated downward about a line connecting supporting points at which two hinge bars adjacent to the first area are supported from a bottom, and remaining areas other than the first area are rotated upward.

26. The button-type transmission control device of claim 6,
wherein the button assembly cover further comprises an assembly base drain hole and a hole side wall,
and wherein the hole side wall is formed to protrude downward around the assembly base drain hole.

27. The button-type transmission control device of claim 26, wherein the assembly base is formed as an inclined surface having the assembly base drain hole as a lowest point.

28. The button-type transmission control device of claim 26, further comprising a housing support which is coupled to the housing,
wherein the housing support comprises a support drain hole and a support drain hole side wall,
wherein the support drain hole side wall is formed to protrude upward around the support drain hole,
and wherein the hole side wall and the support drain hole side wall are arranged to be overlapped with each other.

* * * * *